April 30, 1968        B. WEISSMAN        3,380,161

DETENT FOR AN ARTIFICIAL TOOTH

Filed July 22, 1965

INVENTOR.
BERNARD WEISSMAN

BY Friedman & Goodman

ATTORNEYS

United States Patent Office 3,380,161
Patented Apr. 30, 1968

3,380,161
DETENT FOR AN ARTIFICIAL TOOTH
Bernard Weissman, 304 Ashland Place,
Brooklyn, N.Y. 11217
Filed July 22, 1965, Ser. No. 474,105
3 Claims. (Cl. 32—5)

ABSTRACT OF THE DISCLOSURE

The invention is directed to a detent device for removably securing a dental prosthesis in position, said device comprising a tubular casing, a detent plunger disposed in said casing, said plunger having an end portion projecting externally of said casing, a spring disposed within said casing urging said plunger externally thereof, and stop means carried by said casing for limiting the external projection of said plunger therefrom.

---

The present invention relates to removable artificial dentures and in particular to an improved resilient detent for use in an artificial tooth.

It is an object of the present invention to provide a generally improved resilient detent for use in an artificial tooth to engage an adjacent natural tooth to prevent relative movement between the natural tooth and the artificial tooth.

Another object of the present invention is to provide generally improved means for lending adjustability to the resilient detent to control its maximum outward extent or bias, whereby complete control of the extent of projection of the detent is obtained.

It is another object of the present invention to provide a resilient detent in which there is provided a highly efficient seal between the various parts thereof.

It is another object of the present invention to provide a resilient detent wherein the highly efficient seal thereof is retained even when the detent is adjusted.

It is a further object of the present invention to greatly reduce, if not entirely eliminate, relative wobble between the plunger and casing of the resilient detent.

Other and further objects and advantages of the present invention will be readily apparent to one skilled in the art from a consideration of the following specification taken in connection with the appended drawing.

In the drawing, which illustrates the best mode presently contemplated for carrying out the present invention, FIGURE 1 is a view in elevation of a resilient detent pursuant to the present invention;

Figure 4:
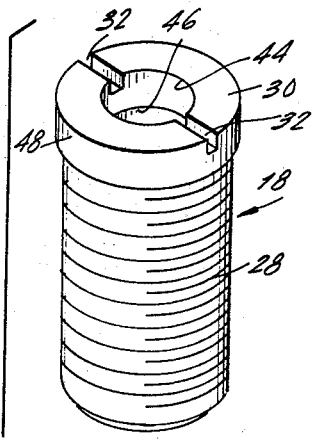
FIGURE 4 is an exploded view of the resilient detent of the present invention taken on an enlarged scale.
Figure 4:
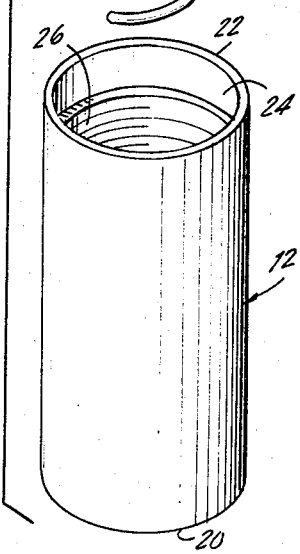

Referring now to the drawings in detail, the reference numeral 10 indicates a resilient detent pursuant to the present invention. As best shown in FIGURE 4, the detent 10 comprises a hollow tubular casing 12, a helical spring 14, a detent plunger 16 and an adjustable stop means 18.

The hollow casing 12 is provided with a closed end 20 and with an open end 22. At the open end 22 thereof, the casing 12 is provided with a counter-bored or recessed portion forming seat 24. Below the seat 24, the casing 12 is of reduced diameter and internally screw threaded as generally indicated by the reference numeral 26.

A stop means 18 is adapted to be threadedly engaged in the casing 12. As here shown, the stop means 18 comprises an externally threaded shank portion surmounted by an enlarged diameter cylindrical collar 30. The enlarged collar 30 is provided with the slots 32 which are adapted to receive a suitable tool whereby the shank 28 may be threaded into and out of engagement with the threaded interior 26 of the casing 12.

Stop means 18 is additionally provided with bore 34 extending axially therethrough and a helical spring 14 is disposed within said bore. As may be seen in FIGURE 3, one end of the spring is seated on an inwardly projecting lip 36 provided at the bottom of the bore through threaded shank 28. The upper end of spring 14 is detained by plunger or piston 16 which is also disposed within said bore 34. Plunger 16 is formed with a detent portion 38 which projects from one end of the enlarged body portion 40 thereof. A small conical projection or pointed portion 42 extends from the opposing end of plunger body 40. The detent portion 38 of plunger 16 extends through an aperture 44 defined in the collar 30 which aperture is in communication with the bore 34 and of smaller diameter than said bore. With the plunger 16 disposed within the bore 34, it will be noted that as previously indicated the lower end of the spring 14 abuts the lip 36 and the upper end of the spring 14 abuts the enlarged body 40 of the plunger 16, the pointed end 42 thereof extending into the upper end of spring 14. The spring biases the plunger 16 in a direction outwardly of the collar 30, the detent portion 38 thereof extending through the aperture 44 and projecting outwardly of the collar. It will be noted that the collar 30 is provided at its inner surface with a shoulder 46 which acts as a stop means for the plunger 16. More specifically, it will be apparent from FIGURE 3 that the spring 14 biases the upper surface of the body portion 40 against the shoulder 46 to limit the outward movement of the plunger 16. The plunger 16 and the spring 14 are assembled in position in the stop means 18 before the latter is disposed within the tubular casing 12. In this connection, it will be understood that the stop means 18 containing the spring 14 and the plunger 16 together constitute an assembled cartridge for mounting within the casing 12. The assembly of the plunger 16 and spring 14 with the stop means 18 is accomplished by the fact that the lip 36 is initially in the form of a bottom tubular extension on the threaded nut 28. Consequently, the plunger and spring may be readily assembled in the bore 34 through the open bottom of the stop means 18. After such assembly, the bottom portion which defines the lip 36 is merely bent upwardly or inwardly to the position thereof shown in FIGURE 3 to retain the plunger under the constant tension of the spring 14 which causes the plunger at all times to be disposed in the position thereof shown in FIGURE 3 in which the upper rim of the body portion 40 abuts the shoulder 46 of the collar 44.

Figure 1:
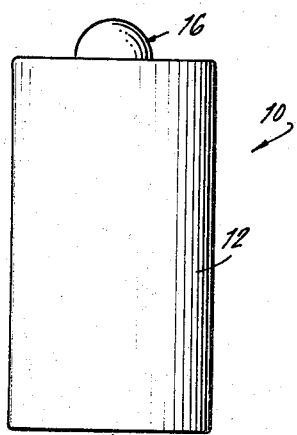
Figure 2:
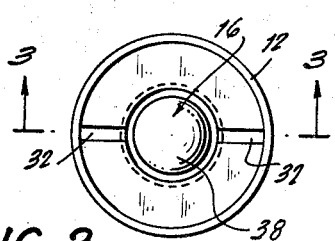
FIGURE 2 is a plan view of the resilient detent.
Figure 3:
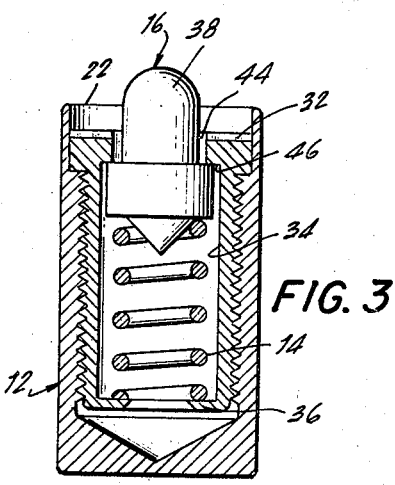
FIGURE 3 is a sectional view taken on the line 3—3 of FIGURE 2.
Figure 5:
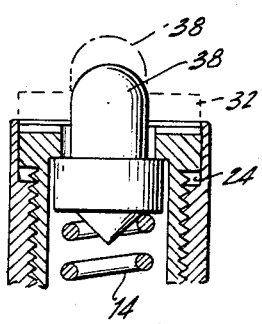
FIGURE 5 is a fragmentary view similar to FIGURE 3 and illustrates different positions of adjustment of the resilient detent.

Pursuant to a feature of the present invention, it will be noted that the outer periphery 48 of the collar 30 is unthreaded and similarly, the complementary inner surface of the seat 24 is unthreaded. Consequently, the rim or peripheral surface 48 bears against the inner surface of the seat 24 with a minimum amount of clearance to provide a highly efficient seal and also to prevent relative wobble between the cartridge assembly and the inner surface of the casing 12. It will be noted that this highly efficient seal is effective whether the stop means 18 is in its maximum retracted position as shown in FIGURE 3 or in its maximum projected position as shown in broken line in FIGURE 5 or in any intermediate position thereof as shown in full line in FIGURE 5. In order to effect relative longitudinal movement of the stop means 18 and the casing 12, the threaded nut 28 is either screwed farther into the casing 12 or screwed outwardly thereof depending upon the extent of projection of the detent part 38 which it is desired to accomplish from the open end 22 of the casing. In order to thread the nut 28 farther into the casing 12 to its maximum threaded position as shown in FIGURE 3, or to project the detent part 38 outwardly from the open end to the various positions shown thereof in FIGURE 5, all that need be done is to insert a suitable tool into the slots 32 in the collar 30 and rotate the latter accordingly. It will be noted that the resilient action of the spring remains constant regardless of changes in adjustment.

Figure 6:
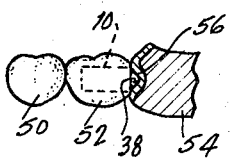
FIGURE 6 is a fragmentary view illustrating a dental prosthesis utilizing a resilient detent pursuant to the present invention.

Referring now to FIGURE 6 in detail, there are shown two artificial teeth 50 and 52 of a suitable dental prosthesis. The artificial tooth 52 is provided with a resilient detent 10 pursuant to the present invention. The dental prosthesis is removably mounted on a natural tooth 54, the detent part 38 extending into a suitably prepared recess 56 therefor in the tooth 54. It will be apparent that the extent of projection of the detent plunger may be readily adjusted by rotating the entire assembly enclosed by the stop means and forming a unitary cartridge disposed within the casing. Furthermore, the entire cartridge may be replaced as a unit in the event that this becomes necessary.

In view of the foregoing, it will be apparent that there has been illustrated and described a highly novel and efficient resilient detent for a dental prosthesis or the like. It will be understood that various changes and modifications may be made therein without, however, departing from the basic inventive concept thereof as set forth in the appended claims.

I claim:

1. A detent device for removably securing a dental prosthesis in position, said device comprising a tubular casing, a detent plunger disposed in said casing, said plunger having an end portion projecting externally of said casing, a spring disposed within said casing urging said plunger externally thereof, stop means carried by said casing for limiting the external projection of said plunger therefrom, said stop means further comprising a shank portion surmounted by an enlarged collar portion, a bore extending axially therethrough, said stop means being adjustable to variably adjust the extent of projection of said detent plunger disposed in said bore from said casing and said enlarged collar portion in slidable engagement with said casing adjacent an end thereof, said spring means being enclosed within said bore and said detent plunger projecting from said stop means at said end of said casing.

2. A detent device for removably securing a dental prosthesis in position, said device comprising a tubular casing, a stop means disposed within said casing and having an end opening, said stop means comprising a shank with a bore extending axially therethrough, a spring disposed within said bore of said stop means, a detent plunger disposed within said stop means in said bore and biased to project through said end opening by said spring, said casing having an end opening through which said plunger extends, and said stop means being adjustable longitudinally of said casing to adjust the degree of projection of said plunger from said casing.

3. A detent device for removably retaining a dental prosthesis in position, said device comprising a tubular casing, a stop means disposed within said casing and having an end opening, said stop means comprising a shank with a bore extending axially therethrough, a spring disposed within said bore of said stop means, a detent plunger disposed within said stop means in said bore and biased to project through said end opening by said spring, said casing having an end opening through which said plunger extends, and said stop means being adjustable longitudinally of said casing to adjust the degree of projection of said plunger from said casing, said casing having an internally threaded bore and said stop means being in threaded engagement in said bore, said casing being provided at said end opening with an enlarged unthreaded recess, and said stop means having an enlarged unthreaded collar in slidable engagement in said recess.

References Cited

UNITED STATES PATENTS 3,057,068  10/1962  Morandi _____ 32—5

FOREIGN PATENTS 147,330  10/1936  Austria.

LOUIS G. MANCENE, *Primary Examiner.*

ROBERT E. MORGAN, *Examiner.*

CHARLES WENTZEL, *Assistant Examiner.*